(12) United States Patent
Tang

(10) Patent No.: US 6,378,126 B2
(45) Date of Patent: Apr. 23, 2002

(54) COMPILATION OF EMBEDDED LANGUAGE STATEMENTS IN A SOURCE CODE PROGRAM

(75) Inventor: Min-Mei Tang, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/162,965

(22) Filed: Sep. 29, 1998

(51) Int. Cl.[7] .............................................. G06F 9/45
(52) U.S. Cl. ...................... 717/5; 717/7; 717/8; 717/9
(58) Field of Search ................................ 395/709, 708, 395/705; 707/101, 104, 104.1, 328; 709/302; 717/9, 8, 5, 2, 3, 4, 7, 10

(56) References Cited

U.S. PATENT DOCUMENTS

| | | | |
|---|---|---|---|
| 5,230,049 A | | 7/1993 | Chang et al. ................... 717/8 |
| 5,339,421 A | * | 8/1994 | Housel, III .................. 709/302 |
| 5,504,885 A | | 4/1996 | Alashqur ....................... 717/5 |
| 5,752,017 A | * | 5/1998 | Bhargava et al. ............... 707/2 |
| 5,850,550 A | * | 12/1998 | Li et al. ......................... 717/8 |
| 5,956,725 A | * | 9/1999 | Burroughs et al. ......... 707/101 |
| 5,956,730 A | * | 9/1999 | Burroughs et al. ......... 707/104 |
| 6,063,133 A | * | 5/2000 | Li et al. ......................... 717/9 |

OTHER PUBLICATIONS

Allain–Hebrard, NETSPEC: from formal nets specifications to code generation, IEEE International Conference on Computational Cybernatics and Simulation, Oct. 1997.*

Kiernan–de Maindreville, Compiling a rule database program into a C/SQL application, IEEE Seventh International Conference on data engineering, Apr. 1991.*

Kiernan–Carey, Extending SQL–92 for OODB access: design and implementation experience, Proceedings of the tenth annual conference on object–oriented programming systems, languages, and applications, Oct. 1995.*

Chamberlin, D.D., et al.; Support for Repetitive Transactions and Ad–hoc Query in System ; May 1979 (Abstract).

Megerian, M.G.; Use of Structured Query Language Packages for Supporting Extended Dynamic Structured Query Language; IBM TDB, vol. 39, No. 2, p. 235–236 (Feb. 1996).

Price, Josh, et al.; DB2/2 Catches Up; DBMS, n12, v8, Nov. 1995.

Butler, Brian; Promise Fulfilled: DB2 for Windows NT; PC Magazine, n6, v15, Mar. 26, 1996.

* cited by examiner

Primary Examiner—Tuan Q. Dam
Assistant Examiner—Hoang-Vu Antony Nguyen-Ba
(74) Attorney, Agent, or Firm—David W. Victor; Konrad Raynes Victor & Mann

(57) ABSTRACT

Disclosed is a system and method for compiling a program. A source program including program statements in a first computer language, such as C++, Fortran, Java, etc., and embedded statements in a second computer language, such as SQL, is processed. A determination is made as to whether a program statement is in one of the first and second languages. The statement is lexically scanned and parsed into a parse tree if the statement is in the first language. If the statement is in the second language, then the statement is lexically scanned. Then a plurality of function calls capable of executing the statement are accessed and translated to at least one parse tree. The parsed statements are converted into target code.

28 Claims, 3 Drawing Sheets

COMPILATION OF EMBEDDED LANGUAGE STATEMENTS IN A SOURCE CODE PROGRAM

BACKGROUND OF THE INVENTION

1. Field of the Invention

The present invention relates to a method and system for compiling a source code program in a host computer language including embedded program statements in a computer language different from the host computer language.

2. Description of the Related Art

A computer source program is typically initially written in a high level computer language, also called source code, comprising descriptive statements of the actions the code will cause the computer to perform. High level computer languages include C++, FORTRAN, COBOL, JAVA™, etc. JAVA is a trademark of Sun Microsystems, Inc. A source program written in such a high level language must be converted into object or machine code, i.e., strings of zeros and ones, which the computer can execute to carry out the steps specified by the program. A compiler program is a computer program that receives as input source code and generates as output object code which may be loaded into the computer memory and executed.

The compiler processes the source code in phases. In the first phase, the lexical scanning phase, the compiler groups the characters of a source program into tokens, which are logically cohesive sequences of characters. During this lexical scanning phase, noise words such as comments and blanks are removed. Next, during a parsing phase, the syntax and semantics of the tokens are checked for errors. A parse tree phase follows where the source statements are converted into a parse tree which describes the syntactic structure of a source statement. A parse tree may be expressed as a syntax tree in which the operators appear as interior nodes and the operands of an operator are the children of the node for that operator.

The parsed tree may then be optimized in manners known in the art to develop the shortest linked lists providing a structure of the code. Another phase of a compiler is the generation of a symbol table. A symbol table is a data structure containing a record for identifiers, e.g., the names of variables, arrays, and functions, and the fields and attributes of identifiers. Next follows an error detection phase and thereafter the code generation phase where target code is generated from the optimized parse tree. The target code may be relocatable machine code or assembly code. The compilation process is described in "Compilers: Principles, Techniques and Tools," by Alfred V. Aho, Ravi Sethi, and Jeffrey D. Ullman, (Addison-Wesley Publishing Co., March 1988), which publication is incorporated herein by reference in its entirety.

Oftentimes, a host language, e.g., C++, Java, Fortran, etc., includes embedded statements in another computer language. For instance, database systems and programs are often searched and accessed using Structured Query Language (SQL) statements. A source program could include such SQL statements to access a database from within the source program. However, SQL statements are in a substantially different format from programming statements in the host program language. To allow a programmer to include SQL statements in a source program in a different language, the SQL statements are often separately processed and compiled by a precompiler, also known as a language dependent compiler. A precompiler scans the source code for SQL statements and generates a separate modified source file for the SQL statements. This modified source file is a new version of the original source file including run-time API calls converted from the SQL statements. The modified source files and any additional source files that do not contain SQL statements are compiled using the appropriate host language compiler. The language compiler converts each modified source file into an object module. Precompiler programs to process SQL statements in source programs are described in U.S. Pat. No. 5,230,049, entitled "Program Source Code Translator, which patent is assigned to International Business Machines Corporation ("IBM"), the assignee of the present patent application, and which is incorporated herein by reference in its entirety.

There is a need in the art for an improved method and system for processing and compiling SQL statements embedded in a host language program.

SUMMARY OF THE PREFERRED EMBODIMENTS

To overcome the limitations in the prior art described above, preferred embodiments disclose a system and method for compiling a program. A source program including program statements in a first computer language and embedded statements in a second computer language is processed. A determination is made as to whether a program statement is in one of the first and second languages. The statement is lexically scanned and parsed into a parse tree if the statement is in the first language. If the statement is in the second language, then the statement is lexically scanned. Then a plurality of function calls capable of executing the statement are accessed and translated into at least one parse tree. The parsed statements are converted into target code.

In further embodiments, the same parse tree structure and parse tree rules are used to parse statements in the first and second languages.

In yet further embodiments, parse trees are optimized after generating parse trees for each statement in the source program. Code is then generated from the optimized parse trees.

In still further embodiments, the second language is SQL and the function calls are application programming interface (API) function calls.

Two-pass parsing systems employing a separate precompiler to generate an intermediate file for the embedded language statements are problematic because of the time required to generate the intermediate file of translated SQL statements, read the source code twice, and develop a precompiler to translate and handle the SQL statements. Further, such two-pass precompilers require the input source file be scanned and processed twice, one for precompilation and the other for translation. Second, the prior art precompiling methods require two copies of lexical scanners, one for the host source code and another for the SQL statements, i.e., the language dependent precompiler. Third, prior art compiling methods use two copies of source files, one with the original SQL statements and one from the precompiler generated modified source output. Fourth, precompilation systems increase the likelihood for error if the user changes statements in the modified source output.

Preferred embodiments provide an improved language processor because the SQL statements are converted to API function calls and then parsed in the same manner that statements in the first language are parsed in the parse tree before being converted into target code. In this way, the embedded language statements are subjected to the same optimization techniques applied to the host language.

Instead of commenting out the SQL statements, inserting API function calls, and then generating a separate intermediate file, the preferred embodiments apply the parsing and parse tree to the API function calls. The language compiler then generates the parse tree and executes the function calls as if there are no SQL statements.

Thus, preferred embodiments eliminate the need for a separate precompiling program to process the SQL statements and eliminate the need to generate an intermediate file with the translated SQL statements.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
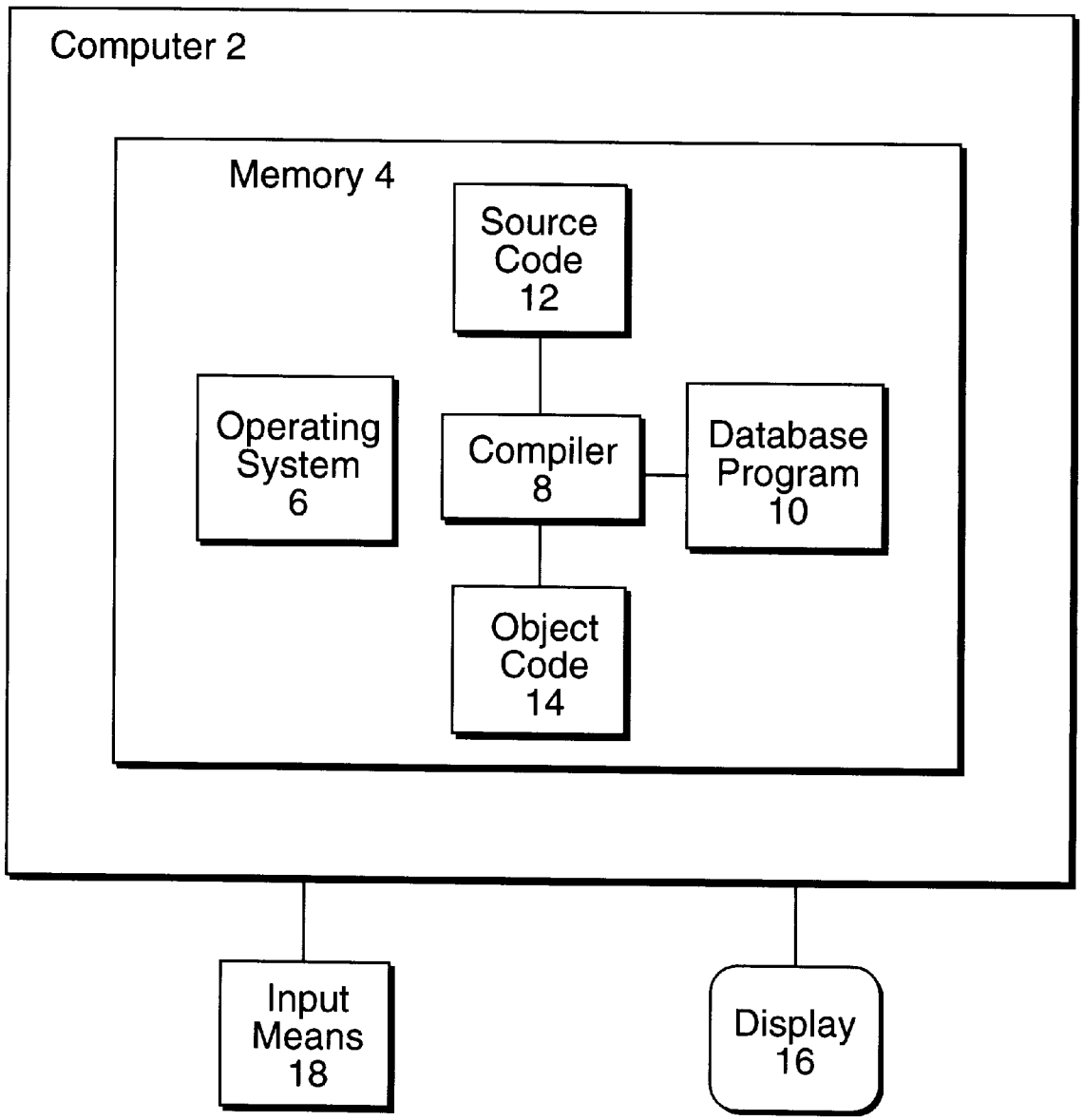
FIG. 1 is a block diagram illustrating a software and hardware environment in which preferred embodiments of the present invention are implemented.

FIG. 1 illustrates a hardware and software environment in which preferred embodiments of the present invention are implemented. A computer 2 includes a memory 4. The computer 2 may be a personal computer, workstation, mainframe, etc operating under microprocessor control. The memory 4 includes an operating system 6, a compiler 8, and a database program 10. The memory 4 may be any suitable volatile memory known in the art, e.g., RAM, DRAM, SRAM, etc., or a combination of volatile and non-volatile memory, e.g., hard disk drives, to provide storage space for programs, whether they are being executed or not. If the memory 10 is comprised of volatile and non-volatile devices, then data and programs may be swapped between the volatile and non-volatile memory devices in a manner known in the art. Moreover, the memory 4 may be distributed throughout a network computing system, where the compiler 8 is in one memory area and the database program 10 is in another area within the distributed network. The operating system 6 may be any suitable operating system such as AIX®, OS/390™, UNIX®, OS/2®, MVS™, WINDOWS®, WINDOWS NT® etc. AIX, OS/390, MVS, and OS/2 are trademarks of IBM; WINDOWS and WINDOWS NT are registered trademarks of Microsoft Corporation; UNIX is a registered trademark licensed by the X/Open Company LTD. The compiler 8 includes compiler 8 includes features typically found in compiler products to process a program comprised of source code 12 and generate object code 14, and includes additional logic to implement preferred embodiments of the present invention. The database program 10 is capable of converting SQL statements into application programming interface (API) function calls, and may be any suitable database program which performs such functions, such as the IBM DB2® UNIVERSAL DATABASE which includes the DB2 precompiler services for converting SQL statements to API function calls. The IBM DB2 system for processing embedded SQL statements is described in IBM publication "Embedded SQL Programming Guide, Version 5," publication no. S10J-8158-00 (Copyright IBM 1993, 1997), which publication is incorporated herein by reference in its entirety. DB2 UNIVERSAL DATABASE is a registered trademark of IBM.

A user controls computer 2 operations via a display 16, which may be any suitable display device known in the art, and an input means 18, which may be a keyboard, mouse, pen-stylus, voice activated input, etc.

The Compiler

In preferred embodiments, the code needed to parse and compile the SQL statements is included in the host language compiler 8. Thus, in preferred embodiments, there is no need for a separate pre-compiler to compile embedded statements in another language, e.g., SQL, separately from compiling the code in the host language. In preferred embodiments, the host language may utilize a context-free grammar or BNF (Bauckus-Naur Form) The grammar in the host compiler 8 is modified to support keywords, such as "EXEC SQL" which enables the compiler 8 lexical scanner to accept SQL statements starting with "EXEC SQL." As soon as the compiler 8 processes the SQL statement, a semantic action routine is invoked to process the SQL statement.

SQL statements are represented by application programming interface (API) function calls. An example of API function calls that underlie various SQL statements used to access a server including the IBM DB2 database are described in IBM publication "IBM DB2 Universal Database API Reference (Version 5)," IBM publication no. S10J-8167-00 (Copyright IBM, 1993, 1997).

Figure 2:
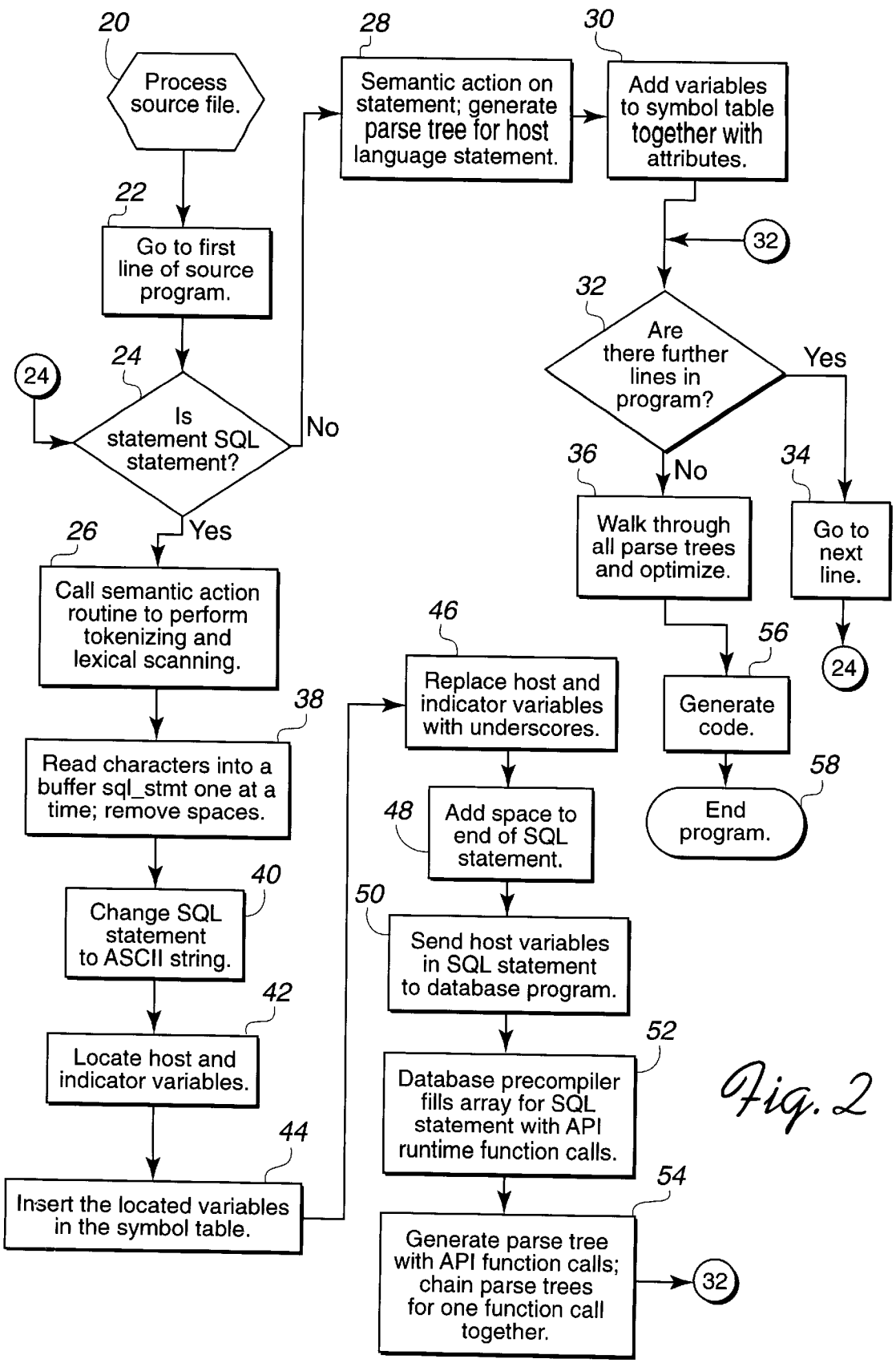
FIG. 2 illustrates logic implemented in the compiler to process embedded language statements in accordance with preferred embodiments of the present invention.

FIG. 2 illustrates logic implemented as software logic in the compiler 8 and database program 10 and executed by the computer 2 to convert a source file including SQL statements and host language statements into target object code 14. Control begins at block 20 which represents the compiler 8 processing a source code 12 file. Control transfers to block 22 where the lexical scanner component of the compiler 8 proceeds to the first line in the source program 12. Control then transfers to block 24 which is a decision block representing the lexical scanner determining whether the statement is an SQL statement. If so, control transfers to block 26; otherwise control transfers to block 28 which represents the compiler 8 performing the lexical scan of the statement and then generating a parse tree in a manner known in the art. In preferred embodiments the parse tree is implemented as a linked list with nodes chained together. Each node may include a node name and one down pointer pointing to the next node deeper in the tree, i.e., a child node, and another pointer having the address of a node at the same depth, i.e., a sibling node.

Control then transfers to block 30 where the compiler 8 adds variables in the statement to a symbol table together with attributes for the variable. The symbol table is a data structure maintained in memory 4. Control transfers to block 32 which is a decision block representing the compiler 8 determining whether there are any further lines of source code 12. If so, control transfers to block 34 to proceed to the next line and then to block 24 et seq. to compile such statement; otherwise, control transfers to block 36.

If the statement being processed at block 24 is an SQL statement, then at block 26 the compiler 8 calls a semantic action routine to perform lexical scanning on the SQL statement and generate tokens for the statement. Control then transfers to block 38 where the compiler 8 reads the characters of the SQL statement into a buffer, e.g., sql_stmt buffer, one at a time, removing any spaces. Control transfers to block 40 where the compiler 8 converts the SQL statement to an ASCII string. Control then transfers to block 42 to locate any host and indicator variables. At block 44, the compiler 8 inserts the located variables in the symbol table, along with any attributes. Control transfers to block 46 where the compiler 8 replaces the host and indicator variables with underscores; at block 48 the compiler 8 adds a space to the end of the SQL statement to accommodate the database program 10, e.g., the database precompiler services in DB2. Control then transfers to block 50 which represents the compiler 8 sending the host variables in the SQL statement to the database program 10, such as the database precompiler services in the IBM DB2 data base program, to generate API runtime function calls for the SQL statement and variables.

Control then transfers to block 52 which represents the database program 10 (database precompiler services) filling an array for the SQL statement with API runtime function calls. Control transfers to block 54 where the compiler 8 generates a parse tree with the API function calls obtained from the database program 10. The parameters of these function calls are nodes in the parse tree. A single SQL statement may be comprised of multiple API function call statements that implement the SQL statement. In preferred embodiments, the parse trees for one function call are chained together. From block 54, control transfers to block 32 et seq.

Figure 3:
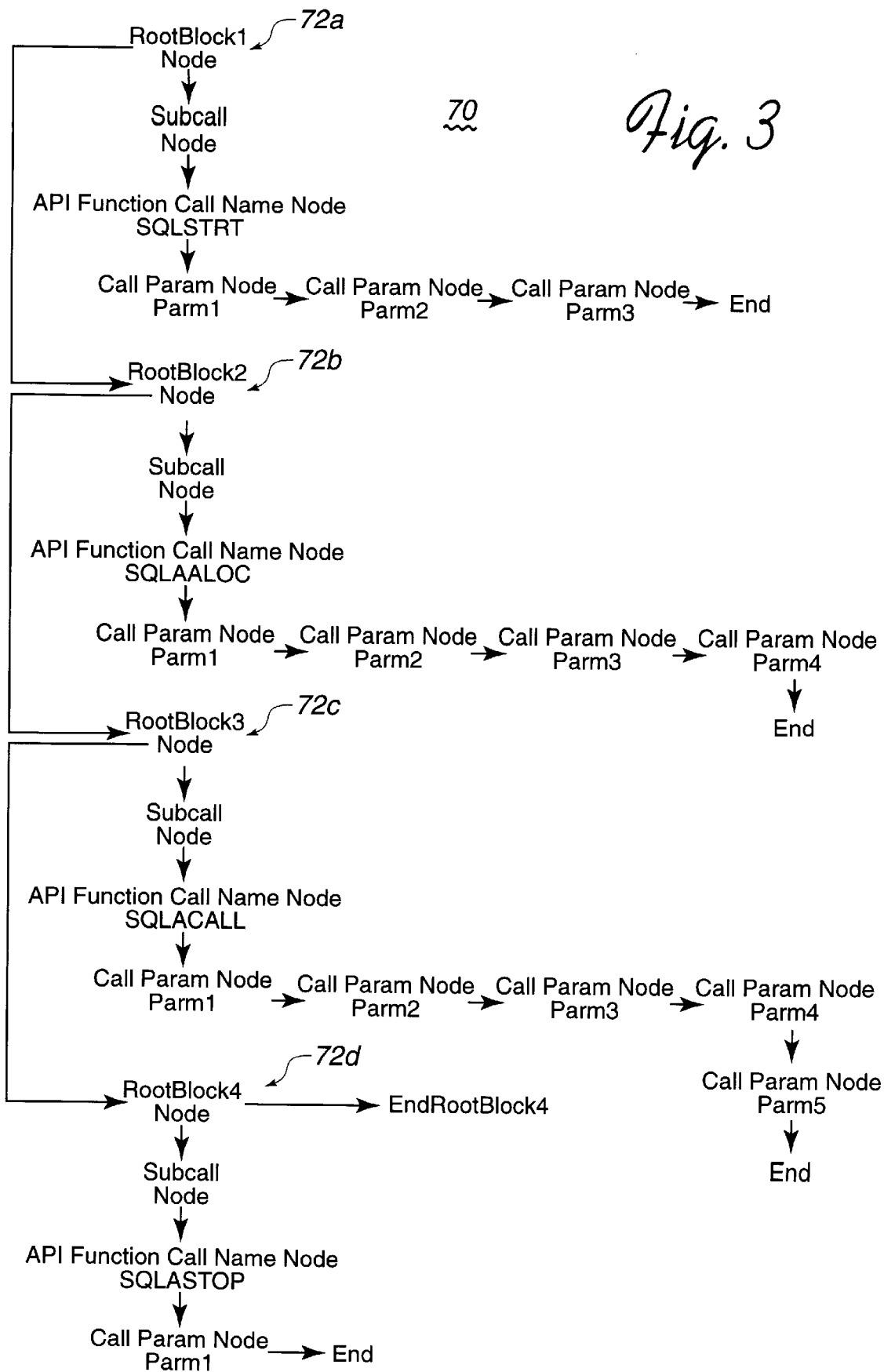
FIG. 3 illustrates a parse tree parsing an embedded language statement in accordance with preferred embodiments of the present invention.

FIG. 3 illustrates a preferred embodiment of a parse tree 70 including the API runtime function calls for a SQL statement generated at block 54 by the compiler 8. The parse tree 70 is maintained as a linked list data structure in memory 4. The parse tree 70 chains all the parse trees for multiple API function calls for a SQL statement into one tree. The parse tree 70 includes four root nodes 72*a, b, c, d* for each component API function call for the SQL statement. Each root node has a pointer to a lower node for a subcall and a pointer horizontally to the next root node, forming a chain of the parse trees that comprise the SQL statement. In the example of FIG. 3, node 1 72*a* points to an API function call SQLSTRT that initializes the runtime process. Node 2 72*b* points to an API function call SQLAALOC that allocates space to the database function call. Node 3 72*c* points to API function call SQLACALL that executes the call. Finally, node 4 72*d* points to SQLASTOP that terminates the runtime process. Each of these function calls have different parameters that are child nodes to the function calls that are passed to the API function call when executed. The down pointers for the parameter nodes are null. After generating the parse tree 70 chaining all the API function call components of the SQL statement, control transfers to block 32 et seq. to process any further lines of source code 12. Different SQL statements will have different API runtime function calls; more complex statements will require more nodes for additional function calls, whereas less complex SQL statements will require fewer nodes and function calls.

If there is no further source code, then at block 36 the compiler 8 walks through and optimizes all the parse trees in a manner known in the art to provide the shortest path in the parse tree. Control then transfers to block 56 where the compiler 8 generates target or object code 14 from the optimized parse tree. The target code generated in the code generation phase may be the object code for the compiler 8, executable code for the interpreter or assembly language code. Code generation comprises instruction selection, register selection, addressing modes, and object code optimization. The object code may be machine dependent or machine independent or absolute machine code or relocatable machine code. A package may also be created, which is the information a database program needs to process the SQL statements against the database when the program is executed. The package may be created during binding. A database manager application uses the package to maintain a compiled version of the SQL statement and executes this compiled version when the program is executed.

After the compile time ends, the object code 14 is then linked and loaded in a manner known in the art. During execution, the database program 10 is accessed to obtain the information requested through the compiled SQL statements.

With the logic of FIG. 2, the SQL statements are processed and parsed in the parse tree like any other host language statements with the API function calls generated directly into the parse trees. An advantage of the logic of FIG. 2 is that the SQL function calls are parsed before being converted into object code. Generally, generating object code is a more consuming and taxing task on system resources than parsing. In fact, object code generation is one of the most difficult tasks in language processing. For instance, a determination must be made as to how to assign registers and addressing modes, e.g., direct, indirect, immediate, doubly indirect, based indirect, etc. Further, machine dependent parameters must be isolated. The logic of FIG. 2, however, parses the SQL statements in the manner that the host language statements are parsed at the front end of compilation before generating code for the embedded SQL statements. In this way, the embedded SQL statements are processed in the same manner as the host language statements. Further, by parsing and lexically/semantically analyzing the SQL statements, the SQL statements are optimized in the same manner that the host language statements are optimized. Optimizing the compilation of the embedded SQL statements improves the efficiency of the code generation process.

Alternative Embodiments and Conclusions

This concludes the description of the preferred embodiments of the invention. The following describes some alternative embodiments for accomplishing the present invention.

Preferred embodiments of the compiler and database program may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Moreover, the media may be in a transmittable format in route through a transmission line from one location to another. Of course, those skilled in the art will recognize many modifications may be made to this configuration without departing from the scope of the present invention.

The preferred embodiments were described with respect to embedded SQL statements. However, in alternative embodiments, the compilation method may apply to any embedded statements that are in a language different from the host language of the source code. Moreover, preferred SQL statements and compilation were described with respect to the IBM DB2 system. However, the preferred embodiments could apply to any type of source file and any database program and SQL statements that could be embedded within a source file.

The preferred embodiments were described with respect to a compiler and a database program including database precompiler services. In alternative embodiments, these functions may be combined in single program or in any combination of various programs. Moreover, the structure of the parse tree and information maintained therein may vary in alternative embodiments.

Preferred embodiments were described with respect to a parse tree structure that includes a separate parse tree for each function call and chaining the parse trees together for a single SQL program statement. However, those skilled in the art will appreciate that numerous parse tree data structures and rules of parse tree construction may be used to generate the parse trees for the API function calls and host language program statements. For instance, all the API function calls may be within a single parse tree as opposed to separate parse trees chained together. Moreover, alternative means may be used to link the nodes of the parse tree than that described herein.

In summary, preferred embodiments in accordance with the present invention provide a system and method for compiling a program. A source program including program statements in a first computer language and embedded statements in a second computer language is processed. A determination is made as to whether a program statement is in one of the first and second languages. The statement is lexically scanned and parsed into a parse tree if the statement is in the first language. If the statement is in the second language, then the statement is lexically scanned. Then a plurality of function calls capable of executing the statement are accessed and translated into at least one parse tree. The parsed statements are converted into target code.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for compiling a program, comprising:
   (a) processing, with a compiler, a source program including program statements in a first computer language and embedded program statements in a second computer language;
   (b) lexically scanning and parsing, with the compiler, each program statement in the first or second computer language into a parse tree during a single pass of the program statements in the source program by performing, during the single pass, for each program statement:
      (i) determining whether the program statement is in one of the first computer language and the second computer language;
      (ii) lexically scanning and parsing the program statement into a parse tree in response to determining that the program statement is in the first computer language;
      (iii) processing the program statement, after determining that the program statement is in the second computer language, by performing:
         (a) calling an application precompiler to generate at least one function call capable of executing the program statement;
         (b) translating, with the compiler, the at least one function call for the program statement into at least one parse tree; and
   (c) converting, with the compiler, the parse trees for the program statements in the first and second computer languages to target code.

2. The method of claim 1, wherein a same parse tree structure and rules of parse tree construction are used for program statements in the first and second computer languages.

3. The method of claim 1, wherein the second computer language is Structured Query Language (SQL) and wherein the function calls are application programming interface (API) function calls that acess data in a database program.

4. The method of claim 3, wherein the program statements in the second computer language comprise SQL statements, wherein the application precompiler comprises a database program precompiler, and wherein calling the application precompiler further comprises:
   passing, with the compiler, variables for the SQL statement to the database program precompiler, wherein the database program precompiler generates the API function calls for the SQL sttements.

5. The method of claim 1, wherein there are a plurality of function calls generated for at least one program statement, wherein the step of parsing the function calls for the program statement in the parse tree comprises:
   generating a root node for each function call generated for the program statement;
   generating a function call node that is a child to the root node and includes the function call;
   generating at least one parameter node that is a child to the function call node including a parameter for the function call; and
   generating a pointer from a parameter node to another parameter node when there is more than one parameter for the function call.

6. The method of claim 5, further comprising the step of generating a pointer in the root nodes that points to another root node of a function call for the program statement, thereby forming a chain of root nodes for the program statement.

7. The method of claim 1, further comprising:
   optimizing, with the compiler, the parse trees after generating parse trees for each program statement in the first and second computer languages in the source program, wherein the optimized parse trees are converted to the target code.

8. The method of claim 1, wherein after determining that the program statement is in the second computer language, further performing:
   converting, with the compiler, the program statements into a form comprehensible to an application precompiler, wherein the converted program statements are sent to the application precompiler.

9. A system for compiling a program, comprising:
(a) a processor;
(b) a memory area, accessible to the processor, including a source program including program statements in a first computer language and embedded program statements in a second computer language;
(c) a compiler program, executed by the processor, to lexically scan and parse each program statement in the first or second computer language in the source program into a parse tree during a single pass of the program statements in the source program, wherein the compiler program is capable of causing the processor to perform, during the single pass, for each program statement:
  (i) determining whether a program statement is in one of the first computer language and the second computer language;
  (ii) lexically scanning and parsing the program statement into a parse tree in response to determining that the program statement is in the first computer language;
  (iii) calling an application precompiler to process the program statement, after determining that the program statement is in the second computer language, to generate at least one function call capable of executing the program statement;
  (iv) translating the at least one function call for the program statement into at least one parse tree; and
  (v) converting the program statements in the parse tree to target code.

10. The system of claim 9, wherein when parsing program statements in the first and second computer languages into parse trees, the compiler program utilizes a same parse tree structure and rules of parse tree construction.

11. The system of claim 9, wherein the second computer language is a Structured Query Language (SQL) and wherein the function calls are application programming interface (API) function calls that access data in a database program.

12. The system of claim 11, wherein the program statements in the second computer language comprise SQL statements, wherein the application precompiler comprises a database program precompiler, and wherein calling the database program precompiler further comprises:
  passing variables for the SQL statement to the database program precompiler, wherein the database program precompiler generates the API function calls for the SQL statement.

13. The system of claim 9, wherein there are a plurality of function calls for at least one program statement, wherein the compiler program parses the function calls for the program statement in the parse tree by:
  generating a root node for each function call generated for the program statement;
  generating a function call node that is a child to the root node and includes the function call;
  generating at least one parameter node that is a child to the function call node including a parameter for the function call; and
  generating a pointer from a parameter node to another parameter node when there is more than one parameter for the function call.

14. The system of claim 13, wherein the compiler program is further capable of causing the processor to perform generating a pointer in the root nodes that points to another root node of a function call for the program statement, thereby forming a chain of root nodes for the program statement.

15. The system of claim 9, wherein the compiler program is further capable of causing the processor to perform:
  optimizing the parse trees after generating parse trees for each program statement in the first and second computer languages in the source program, wherein the optimized parse trees are converted to the target code.

16. The system of claim 9, wherein after determining that the program statement is in the second computer language, further performing:
  converting, with the compiler program, the program statements into a form comprehensible to an application precompiler, wherein the converted program statements are sent to the application precompiler.

17. An article of manufacture for use in programming a computer system to compile a source program, the article of manufacture comprising computer readable storage media accessible to the computer system, wherein the computer readable storage media has a compiler and application precompiler embedded therein that cause the computer system to perform:
  (a) processing, when executing the compiler, the source program including program statements in a first computer language and embedded program statements in a second computer language;
  (b) lexically scanning and parsing, with the compiler, each program statement in the first or second computer language into a parse tree during a single pass of the program statements in the source program by performing, during the single pass, for each program statement:
    (i) determining whether the program statement is in one of the first computer language and the second computer language;
    (ii) lexically scanning and parsing the program statement into a parse tree in response to determining that the program statement is in the first computer language;
    (iii) processing the program statement, after determining that the program statement is in the second computer language, by performing:
      (A) calling the application precompiler to generate at least one function call capable of executing the program statement; and
      (B) translating, when executing the compiler, the at least one function call for the program statement into at least one parse tree; and
  (c) converting, when executing the compiler, the parse trees for the program statements in the first and second computer languages to target code.

18. The article of manufacture of claim 17, wherein a same parse tree structure and rules of parse tree construction are used to parse program statements in the first and second computer languages.

19. The article of manufacture of claim 17, wherein the second computer language is a Structured Query Language (SQL) and wherein the function calls are appliation programming interface (API) function calls that access data in a database program.

20. The article of manufacture of claim 19, wherein the program statements in the second computer language comprise SQL statements, wherein the application precompiler comprises a database program precompiler, and wherein calling the application precompiler further comprises:

passing variables for the SQL statement to the database program precompiler, wherein the database program precompiler generates the API function calls for the SQL statement.

21. The article of manufacture of claim 17, wherein there are a plurality of function calls generated for at least one program statement, wherein parsing, with the compiler, the function calls for the program statement in the parse tree further comprises:

generating a root node for each function call generated for the program statement;

generating a function call node that is a child to the root node and includes the function call;

generating at least one parameter node that is a child to the function call node including a parameter for the function call; and generating a pointer from a parameter node to another parameter node when there is more than one parameter for the function call.

22. The article of manufacture of claim 21, further performing, when executing the compiler, generating a pointer in the root nodes that points to another root node of a function call for the program statement, thereby forming a chain of root nodes for the program statement.

23. The article of manufacture of claim 22, wherein the compiler further causes the computer system to perform:

optimizing the parse trees after generating parse trees for each program statement in the first and second computer languages in the source program wherein the optimized parse trees are converted to the target code.

24. The article of manufacture of claim 17, wherein after determining that the program statement is in the second computer language, the compiler further causes the processor to perform:

converting the program statements into a form comprehensible to an application precompiler, wherein the converted program statements are sent to the application precompiler.

25. A memory device storing data structures accessible to an application program for compiling a source program, wherein the source program is comprised of program statements in a first computer program language and embedded program statements in a second computer language, wherein the data structures comprise a plurality of parse trees that are processed to generate target code, wherein program statements in the first computer language are parsed into at least one parse tree by a compiler during a single pass of the source program comprising:

(i) a root node;

(ii) an operator node that is a child to the root node including an operator for executing the program statement; and (iii) an operand node that is a child node to the operator node comprising an operand for the operator; and wherein program statements in the second computer language are parsed into at least one parse tree by the compiler during the single pass of the source program comprising:

(i) a root node for each function call for the program statement, wherein the program statement is executed by at least one function call and wherein the function calls are provided by an application precompiler that receives program statements from the compiler and generates and returns function calls capable of executing the program statement;

(ii) a function call node including the function call that is a child node to the root node; and (iii) at least one parameter node that is a child node to the function call, wherein the parameter node is a parameter passed to the function call.

26. The memory device of claim 25, wherein a same parse tree structure and rules of parse tree construction are used to parse program statements in the first and second computer languages.

27. The memory device of claim 25, wherein the second computer language is a Structured Query Language (SQL) and wherein the function calls are application programming interface (API) function calls that access data in a database program.

28. The memory device of claim 25, wherein the program statements in the second computer language are executed by a plurality of function calls, wherein the root node for the function calls include a pointer to another root node for a function call thereby forming a chain of root nodes for the program statement in the second computer language.

* * * * *

UNITED STATES PATENT AND TRADEMARK OFFICE
CERTIFICATE OF CORRECTION

PATENT NO. : 6,378,126 B2
DATED : April 23, 2002
INVENTOR(S) : Min-Mei Tang

It is certified that error appears in the above-identified patent and that said Letters Patent is hereby corrected as shown below:

Column 10,
Line 60, delete "appliation" and insert -- application --

Signed and Sealed this

Second Day of August, 2005

JON W. DUDAS
*Director of the United States Patent and Trademark Office*